United States Patent
Chen

(10) Patent No.: US 10,872,291 B2
(45) Date of Patent: Dec. 22, 2020

(54) ON-CHIP COMMUNICATION SYSTEM FOR NEURAL NETWORK PROCESSORS

(71) Applicant: ALIBABA GROUP HOLDING LIMITED, Grand Cayman (KY)

(72) Inventor: Jian Chen, San Mateo, CA (US)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 236 days.

(21) Appl. No.: 15/980,685

(22) Filed: May 15, 2018

(65) Prior Publication Data

US 2019/0197389 A1 Jun. 27, 2019

Related U.S. Application Data

(60) Provisional application No. 62/610,127, filed on Dec. 22, 2017.

(51) Int. Cl.
| | | |
|---|---|---|
| *G06F 13/38* | (2006.01) | |
| *G06N 3/04* | (2006.01) | |
| *G06N 3/063* | (2006.01) | |
| *G06F 9/38* | (2018.01) | |

(52) U.S. Cl.
CPC .............. *G06N 3/04* (2013.01); *G06F 9/38* (2013.01); *G06N 3/0454* (2013.01); *G06N 3/063* (2013.01)

(58) Field of Classification Search
None
See application file for complete search history.

(56) References Cited

U.S. PATENT DOCUMENTS

| | | | |
|---|---|---|---|
| 6,725,307 B1 | 4/2004 | Alvarez, II et al. | |
| 8,307,116 B2 | 11/2012 | Keckler et al. | |
| 8,346,998 B2 | 1/2013 | James et al. | |
| 10,515,046 B2 * | 12/2019 | Fleming | G06F 15/825 |
| 2012/0131288 A1 | 5/2012 | Box et al. | |
| 2012/0303932 A1 | 11/2012 | Farabet et al. | |
| 2016/0350645 A1 | 12/2016 | Brothers et al. | |
| 2017/0250926 A1 | 8/2017 | Chen et al. | |

FOREIGN PATENT DOCUMENTS

| | | |
|---|---|---|
| EP | 0913797 A1 | 5/1999 |
| WO | WO 2019/126740 A1 | 6/2019 |

OTHER PUBLICATIONS

Kim et al., "Flattened Butterfly Topology for On-Chip Networks," IEEE Computer Architecture Letters, 6(2): 37-40 (2007).
Liu et al., "IMR: High-Performance Low-Cost Multi-Ring NoCs," IEEE Transactions on Parallel and Distributed Systems, 27(6): 1700-1712 (2016).
PCT International Search Report and Written Opinion dated Apr. 15, 2019, issued in corresponding International Application No. PCT/CN18/67276 (10 pages).

* cited by examiner

*Primary Examiner* — Cheng Yuan Tseng
(74) *Attorney, Agent, or Firm* — Finnegan, Henderson, Farabow, Garrett & Dunner, LLP

(57) ABSTRACT

The present disclosure provides an on-chip communication system for neural network processors, a processing device, and a method for operating on an on-chip communication system. The system can include a cluster manager configured to generate a global signal, and a plurality of tile units in a tile array coupled with the cluster manager, each including two connectors and a node connected between the two connectors.

18 Claims, 13 Drawing Sheets

1010

ON-CHIP COMMUNICATION SYSTEM FOR NEURAL NETWORK PROCESSORS

CROSS REFERENCE TO RELATED APPLICATION

The disclosure claims the benefits of priority to U.S. Provisional Application No. 62/610,127, filed Dec. 22, 2017, which is incorporated herein by reference in its entirety.

BACKGROUND

With the exponential growth on the neural network based deep learning applications such as image recognition, voice/speech recognition, and machine translation, the commodity CPU/GPU based platform is no longer a suitable computing substrate to support the ever growing computation demands in terms of performance, power efficiency and economic scalability. Developing neural network processors to accelerate neural-network-based deep-learning applications has gained significant tractions across many business segments, including established chip makers, startup companies as well as large Internet companies.

The conventional interconnection fabrics of the neural network processors are typically built on top of routers. A router can support any type of communications on a given fabric topology. For example, the router can be designed to contain functional modules for all types of communications and a large number of buffers to temporarily hold the incoming and outgoing packets. Therefore, the functional modules for all types of communications and the large number of buffers consume significant on-chip resources, yet a great portion of the functional modules and buffers cannot be used for neural network processing. Further, the conventional interconnection fabrics do not support effective partition and isolation.

SUMMARY OF THE DISCLOSURE

Embodiments of the disclosure provide an on-chip communication system for neural network processors. The system can include a cluster manager configured to generate a global signal; a bus; and a plurality of tile units communicatively coupled with the cluster manager via the bus, wherein each tile unit includes a first set of connectors and at least one node that is connected between connectors of the first set of connectors, wherein the at least one node is configured to acquire the global signal.

Embodiments of the disclosure further provide a processing device coupled to one of a first set of connectors via a first terminal and to another one of the first set of connectors via a second terminal. The processing device can include: a bypass bus connected between the first and second terminals and configured to communicate data signals between the first and second terminals; a buffer bus connected between the first and second terminals and configured to buffer the data signals; and one or more multiplexers configured to enable one of the bypass bus and the buffer bus according to a mode signal.

Embodiments of the disclosure also provide a method for operating on an on-chip communication system. The on-chip communication system can include a cluster manager and a plurality of tile units in a tile array communicatively coupled with the cluster manager via a bus. The method can include: receiving a task; determining available tile units of the tile array coupled with the cluster manager, wherein each tile unit includes a first set of connectors and at least one node that is connected between the first set of connectors; generating a global signal according to the available tile units of the tile array; and connecting the available tile units into a ring topology based on the global signal.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Particular aspects of the present disclosure are described in greater detail below. The terms and definitions provided herein control, if in conflict with terms and/or definitions incorporated by reference.

The embodiments of the disclosure provide an on-chip communication system for neural network processors.

The disclosed embodiments provide an elastic router-less interconnection fabric that addresses the shortcomings existing in conventional solutions. The embodiments described herein provide a flexible routerless on-chip communication system as well as its working mechanism. By using coordinated control across the nodes, the neural network processors can avoid the routers in the communication fabric, and can efficiently support the communication patterns required by artificial neural network processing.

Figure 1:
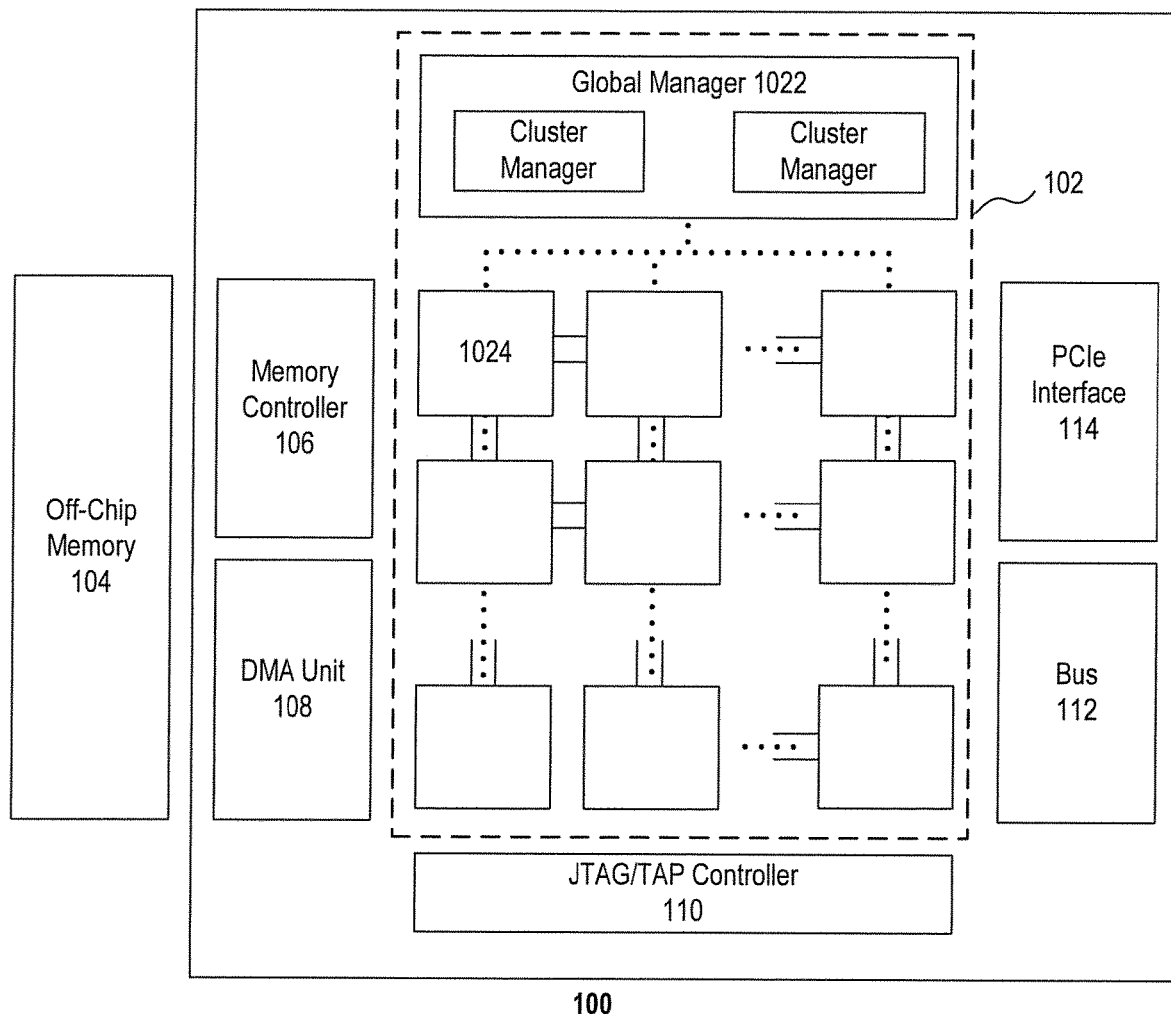
FIG. 1 illustrates an exemplary on-chip architecture, according to embodiments of the disclosure.

FIG. 1 illustrates an exemplary on-chip architecture 100, according to embodiments of the disclosure. As shown in FIG. 1, on-chip architecture 100 can include an on-chip communication system 102, an off-chip memory 104, a memory controller 106, a direct memory access (DMA) unit 108, a Joint Test Action Group (JTAG)/Test Access End (TAP) controller 110, a bus 112, a peripheral component interconnect express (PCIe) interface 114, and the like. It is appreciated that, on-chip communication system 102 can perform algorithmic operations based on communicated data.

On-chip communication system 102 can include a global manager 1022 and a plurality of tiles 1024. Global manager 1022 can include at least one cluster manager to coordinate with tiles 1024. For example, each cluster manager can be associated with an array of tiles. As shown in FIG. 1, global manager 1022 can include two cluster managers to coordinate with two arrays of tiles. Tiles 1024 can be configured to perform an operation (e.g., algorithmic calculation) on the communicated data under the control of global manager 1022.

Off-chip memory 104 can include read-only memory (ROM), erasable programmable read-only memory (EPROM) or the like. Off-chip memory 104 can be configured to store a large amount of data with slower access speed, compared to the on-chip memory integrated within one or more processor.

Memory controller 106 can read, write, or refresh one or more memory devices. The memory devices can include the on-chip memory and the off-chip memory. For example, the memory device can be implemented as any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

DMA unit 108 can generate memory addresses and initiate memory read or write cycles. DMA unit 108 can contain several hardware registers that can be written and read by the one or more processor. The registers can include a memory address register, a byte count register, and one or more control registers. These registers can specify some combination of the source, the destination, the direction of the transfer (reading from the input/output (I/O) device or writing to the I/O device), the size of the transfer unit, and/or the number of bytes to transfer in one burst.

JTAG/TAP controller 110 can specify a dedicated debug port implementing a serial communications interface (e.g., a JTAG interface) for low-overhead access without requiring direct external access to the system address and data buses. The JTAG/TAP controller 110 can also specify an on-chip test access interface (e.g., a TAP interface) that implements a protocol to access a set of test registers that present chip logic levels and device capabilities of various parts.

Bus 112 can include intra-chip bus and inter-chip bus. The intra-chip bus can connects all the internal components of on-chip architecture 100, such as on-chip communication system 102, off-chip memory 104, memory controller 106, DMA unit 108, JTAG/TAP controller 110, and PCIe interface 114 to each other. The inter-chip bus can provide connections between chips.

PCIe interface 114 can support full-duplex communication between any two endpoints, with no inherent limitation on concurrent access across multiple endpoints.

Figure 2:
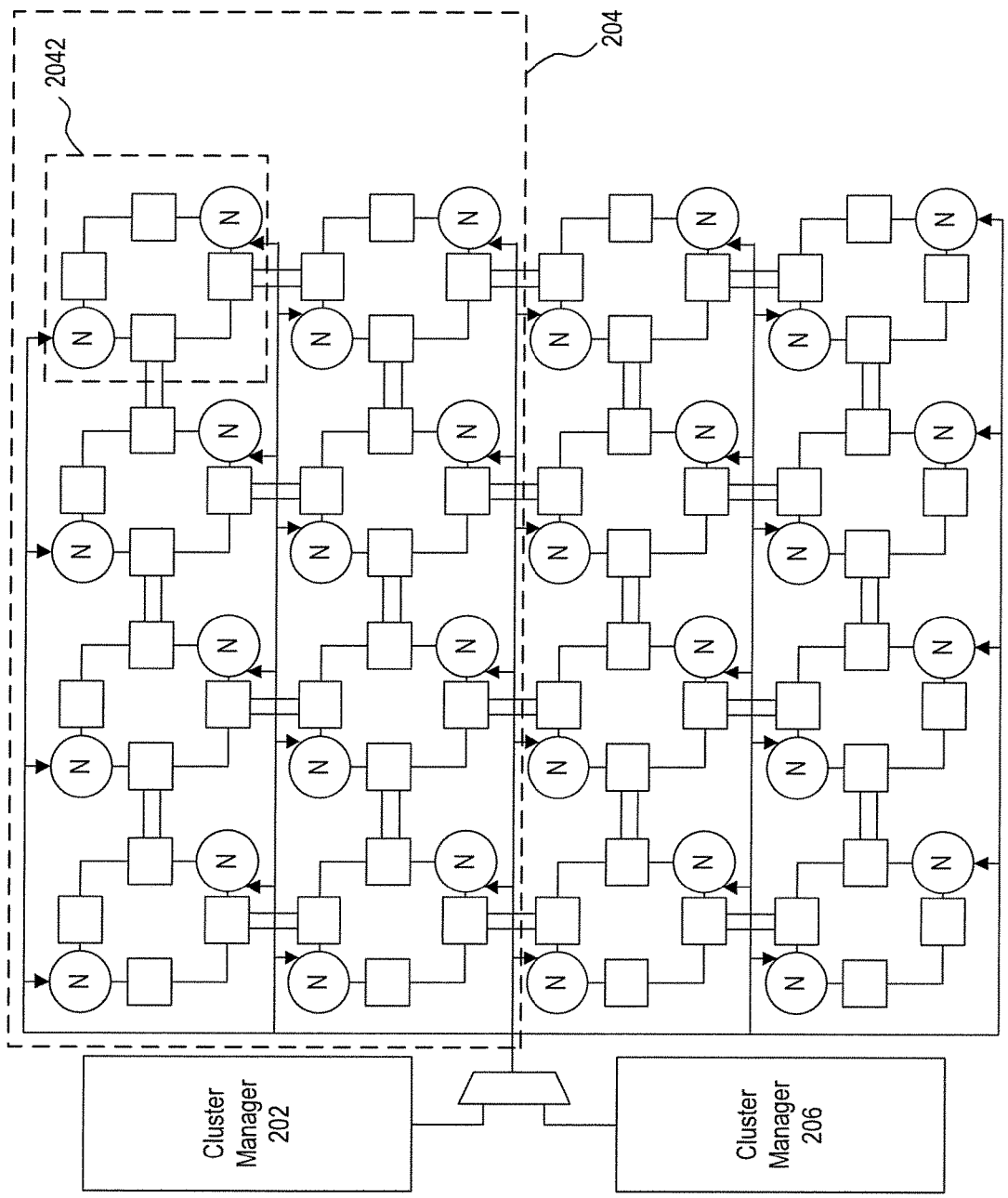
FIG. 2 illustrates a block diagram of an exemplary on-chip communication system, according to embodiments of the disclosure.

FIG. 2 illustrates a block diagram of an exemplary on-chip communication system 102, according to embodiments of the disclosure.

As shown in FIG. 2, on-chip communication system 102 can include a cluster manager 202 and a tile array 204.

Cluster manager 202 can be configured to generate a global signal for organizing tile array 204. Cluster manager 202 can be connected to the tile units via a global bus. It is appreciated that, on-chip communication system 102 can include more than one cluster manager. For example, as shown in FIG. 2, based on the number of multiple tasks that are supported, two cluster managers 202 and 206 can be provided on on-chip communication system 102.

Each cluster manager (e.g., 202) can send the global signal via the global bus. The global signal can be used for initial cluster partition setup and operation commands. Each cluster manager (e.g., 202) can be associated with a tile array (e.g., 204), and one or more tile array can form a mesh array. For example, when the tile arrays associated with cluster managers 202 and 206 are organized together, a 4-tile×4-tile mesh array can be formed as shown in FIG. 2. It is appreciated that the mesh array can include N rows and M columns, where N and M can be any positive integer numbers.

Figure 3A:
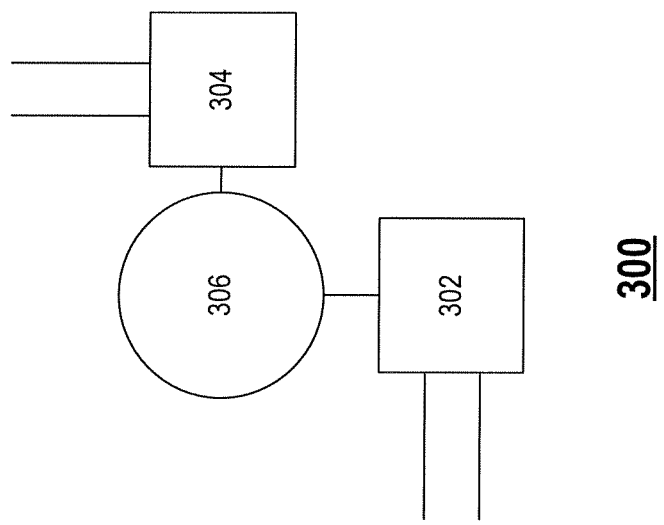
FIG. 3A illustrates a block diagram of an exemplary tile unit, according to embodiments of the disclosure.

Tile array 204 can include a plurality of tile units communicatively coupled with cluster manager 202, and two tile units can form a tile, such as a tile 2042. FIG. 3A illustrates a block diagram of an exemplary tile unit 300, according to embodiments of the disclosure.

As shown in FIG. 3A, tile unit 300 can include at least one node 306 communicatively coupled to a connector 302 and a connector 304 of a set of connectors. Node 306 can contain two terminals to be connected with connectors 302 and 304, respectively. As each tile includes two tile units, each tile (such as tile 2042) can include two nodes and four connectors as shown in FIG. 2. The details of node 306 will be further described as below.

Figure 3B:
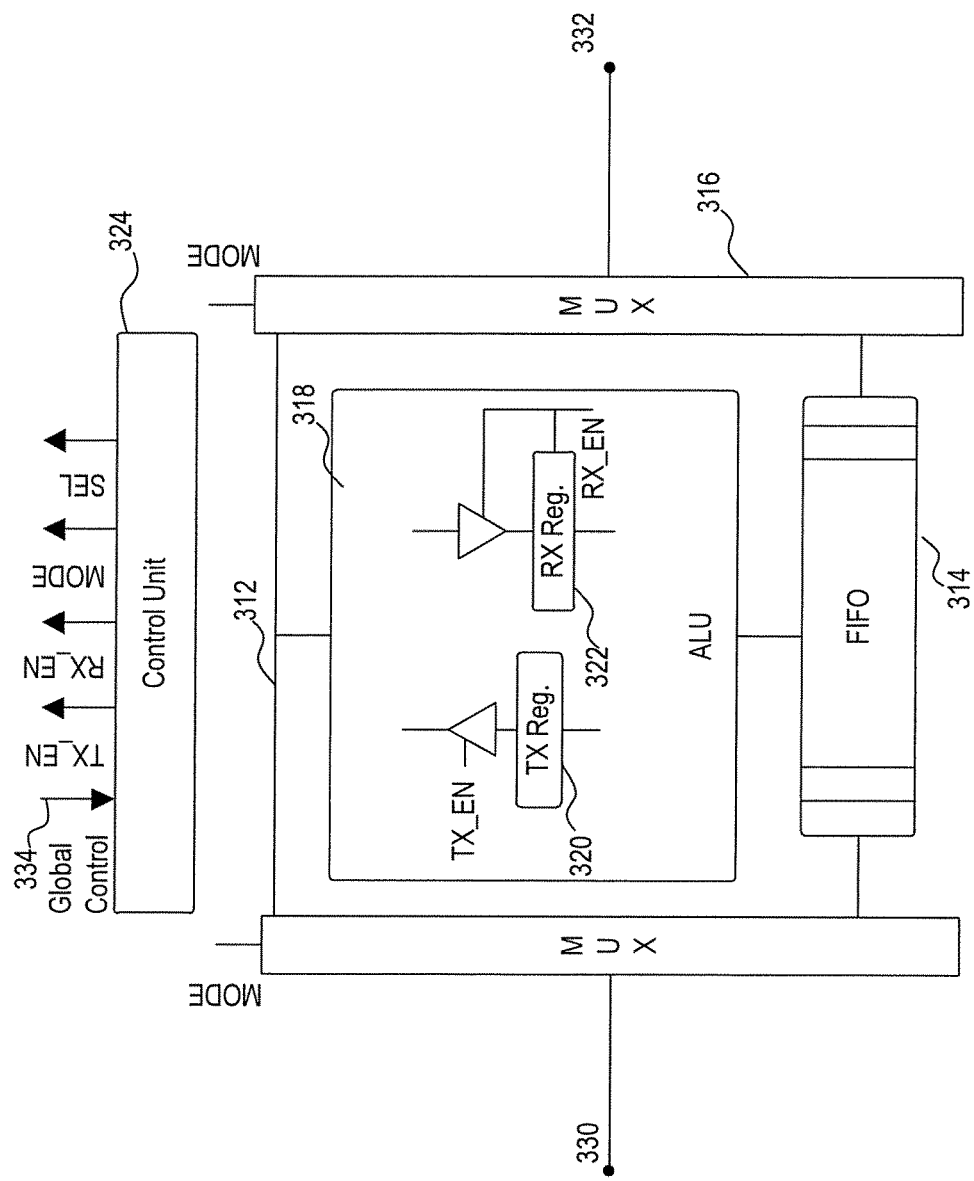
FIG. 3B illustrates a block diagram of an exemplary node of an on-chip communication system, according to embodiments of the disclosure.

FIG. 3B illustrates a block diagram of an exemplary node 306 of an on-chip communication system, according to embodiments of the disclosure.

Node 306 can be communicatively coupled to connector 302 via a first terminal 330, to connector 304 via a second terminal 332, and to the rest of on-chip communication system 102 via a third terminal 334. In some embodiments, first terminal 330 and second terminal 332 can be connected with connectors 302 and 304 to transceive data signals, and third terminal 334 can be connected with cluster manager 202 to receive the global signal via the global bus.

Node 306 can further include a bypass bus 312, a buffer bus 314, and a multiplexer 316.

Bypass bus 312 can be connected between first terminal 330 and second terminal 332, and configured to communicate the data signals between first terminal 330 and second terminal 332. As first terminal 330 and second terminal 332 can be connected with other tile units of on-chip communication system 102, bypass bus 312 can be used to broadcast data to the rest of on-chip communication system 102 or simply bypass node 306.

Buffer bus 314 can also be connected between first terminal 330 and second terminal 332, and include a First-In-First-Out (FIFO) buffer to buffer the data signals. The FIFO buffer can be used to store data to be processed by node 306.

Multiplexer 316 can enable one of bypass bus 312 and buffer bus 314 according to a mode signal. In some embodiments, multiplexer 316 can include two multiplexing devices. For example, as shown in FIG. 3B, node 306 can include two multiplexing devices, each connected to both of bypass bus 312 and buffer bus 314. It is appreciated that multiplexer 316 can include, for example, four metal-oxidesemiconductor (MOS) field effect transistors (FETs) to implement the function of enabling one of bypass bus 312 and buffer bus 314. Therefore, multiplexer 316 can be implemented in various manners and may not be limited by the exemplary structure of FIG. 3B. By multiplexer 316, node 306 can switch between a bypass mode and a buffer mode.

Node 306 can further include an arithmetic logic unit (ALU) 318 for performing one or more operations based on the data signals. ALU unit 318 can be communicatively coupled with both bypass bus 312 and buffer bus 314. For example, ALU unit 318 can include a transmission unit 320 connected with bypass bus 312, and can be configured to transmit data to bypass bus 312 according to a transmission enable signal (TX_EN). ALU unit 318 can further include a receiving unit 322 connected with bypass bus 312, and can be configured to receive data from bypass bus 312 according to a receiving enable signal (RX_EN). Transmission unit 320 can include a register connected with bypass bus 312 and a switch connected between the register and ALU unit 318. In some embodiments, the switch can be a three-state buffer that allows ALU unit 318 to send data to the register when the transmission enable signal is on and eliminate the influence from bypass bus 312 when the transmission enable signal is off. Similarly, receiving unit 322 also can include a register connected with bypass bus 312 and a switch connected between the register and ALU unit 318. In some embodiments, the switch can be a three-state buffer that allows ALU unit 318 to receive data from the register when the receiving enable signal is on and eliminate the influence from receiving unit 322 when the receiving enable signal is off. Thus, a connector embedded with such a switch can dynamically switch between transceiving data with an ALU unit and bypassing the ALU unit.

It is appreciated that receiving unit 322 of ALU unit 318 can also be connected with buffer bus 314 to receive data from buffer bus 314 according to the receiving enable signal. In some embodiments, transmission unit 320 of ALU unit 318 can also be connected with buffer bus 314 to transmit data to buffer bus 314.

The connections of transmission unit 320 and receiving unit 322 with bypass bus 312 and buffer bus 314 are not illustrated in FIG. 3B for clarity.

As only one of bypass bus 312 or buffer bus 314 can be enabled, ALU unit 318 can receive data from either bypass bus 312 or buffer bus 314. In some embodiments, when multiplexer 316 enables buffer bus 314 and the receiving enable signal is on, ALU unit 318 can receive data from the FIFO buffer and then process the data. In some embodiments, when multiplexer 316 enables bypass bus 312 and the receiving enable signal is on, ALU unit 318 can receive data from bypass bus 312 and then process the data.

Node 306 can further include a control unit 324 configured to generate the transmission enable signal, the receiving enable signal, and the mode signal, according to the global signal acquired via third terminal 334. In some embodiments, control unit 324 can further generate a selection (SEL) signal for configuring connectors. Though, in FIG. 3B, control unit 324 is an embedded component of node 306, control unit 324 also can be a component shared by more than two nodes.

Figure 3C:
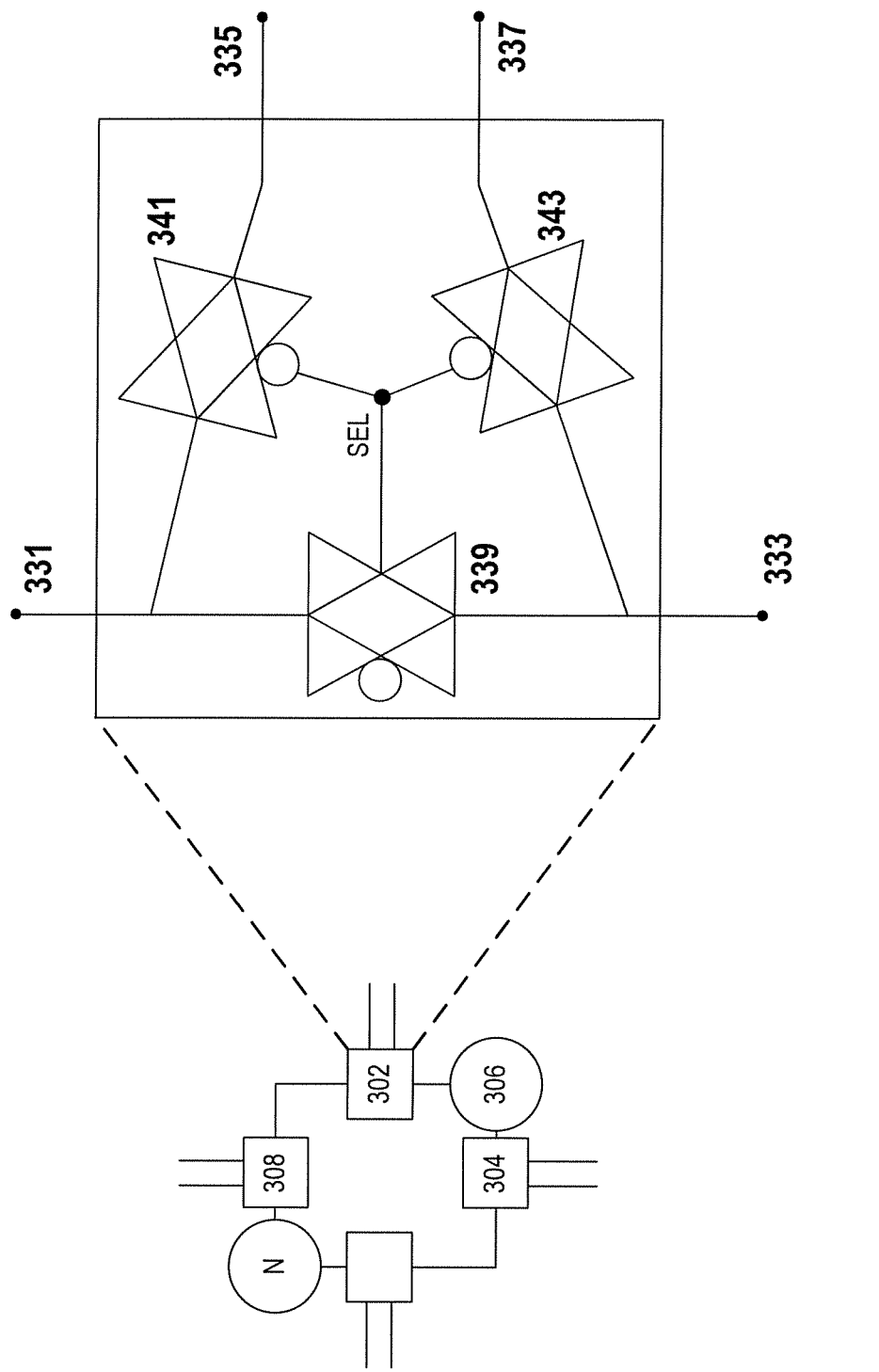
FIG. 3C illustrates a block diagram of an exemplary connector of an on-chip communication system, according to embodiments of the disclosure.

FIG. 3C illustrates a block diagram of an exemplary connector 302 of an on-chip communication system, according to embodiments of the disclosure. As discussed above, a tile unit can include at least one node and two dynamic connectors (e.g., 302 and 304). The two connectors (e.g., 302 and 304) can be identical to each other. Therefore, only one exemplary connector 302 will be described herein with reference to FIG. 3C.

Connector 302 can include four terminals (331, 333, 335, and 337) and three transfer gates (339, 341, and 343) that control the open and close of three connections between terminals 331 and 333, terminals 333 and 335, and terminals 333 and 337.

As discussed above, one tile can include two tile units. In some embodiments, terminals 331 and 333 can be internal terminals for connection with connectors of the other tile unit in the same tile. By connecting two tile units, for example, two nodes of the two tile units can be connected together through the connectors, forming a two-node ring. Terminals 335 and 337 can be external terminals for connection with another tile. By connecting at least two tiles, a multi-node ring can be formed. Therefore, the connection and disconnection of the connectors of at least one tile can generate various node rings to pass data among different nodes for a variety of operations. The connection of tiles can be referred to as a ring topology.

The connection and disconnection of the connectors can be controlled by the gates. In some embodiments, gate 339 can be communicatively coupled with node 306 and a connector 308 of another set of connectors for another tile unit in a same tile. Gate 341 can be communicatively coupled with connector 308 and a connector of yet another set of connectors for yet another tile unit in a neighboring tile. Gate 343 can be communicatively coupled with node 306 and a connector of the yet another set of connectors. When the SEL signal is set to "1", gate 339 is enabled to connect terminals 331 and 333, gate 341 is disabled to disconnect terminals 331 and 335, and gate 343 is also disabled to disconnect terminals 333 and 337. When the SEL signal is set to "0", gate 339 is disabled to disconnect terminals 331 and 333, gate 341 is enabled to connect terminals 331 and 335, and gate 343 is also enabled to disconnect terminals 333 and 337.

Therefore, by applying the SEL signal generated by control unit 324, connectors (e.g., 302 and 304) can be configured to connect/disconnect with another connector within a same tile or from another tile, and/or connect/disconnect with the node(s) coupled with the connectors. Thus, the ring topology of the tiles can be formed according to the SEL signal.

Figure 4:
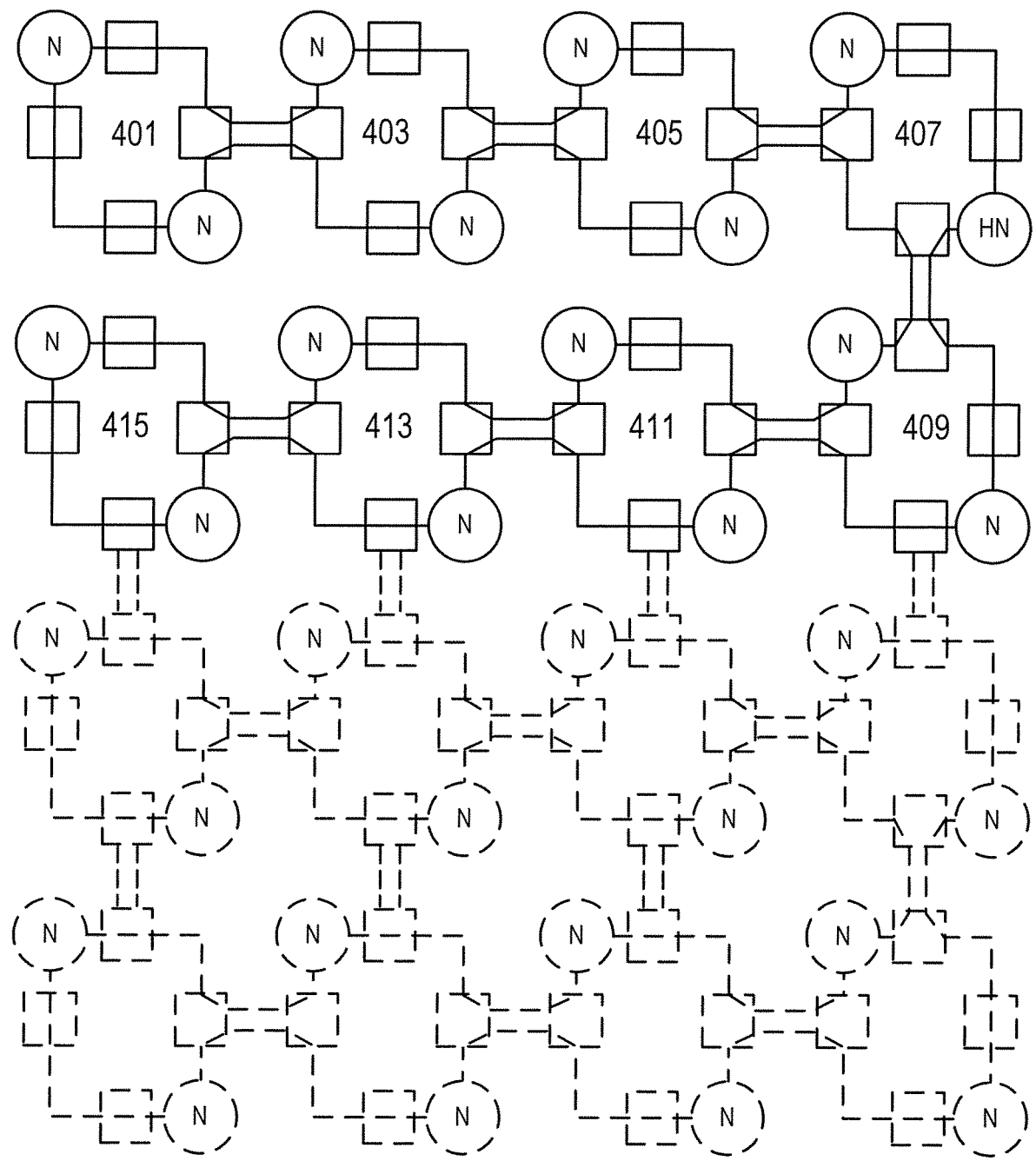
FIG. 4 illustrates an exemplary ring topology, according to embodiments of the disclosure.

FIG. 4 illustrates an exemplary ring topology 400, according to embodiments of the disclosure. As discussed above, each cluster manager 202 can be associated with a tile array including a plurality of tiles, and one or more tile array can form a mesh array. FIG. 4 illustrates a mesh array consisting two tile arrays. The first tile array including tiles 401-415 is indicated by solid lines, and the second tile array is indicated by dashed lines. As the first and second tile arrays are similar or same, only the first tile array including tiles 401-415 will be described as below.

In FIG. 4, the mesh array can include three types of tiles. A first type includes tiles at the boundary of the tile array (e.g., tiles 401-415), a second type includes tiles at the boundary of the mesh array (e.g., tiles 401-409 and 415), and a third type includes tiles at both the boundary of the tile array and the boundary of mesh array (e.g., 401-409 and 415).

Because the mesh array is fixed for a given chip, each node can be made aware of its physical location by hard-coding the X-Y coordinates. The relative location in the allocated ring connection, however, can be achieved by locating the tile's position in a resource bitmask allocated by the cluster manager(s).

In embodiments of the disclosure, the on-chip tiles and their connections can be flexibly reconfigured on the fly. For example, by controlling the SEL signal, one tile can open a connection to the neighboring tile or disconnect from it. This allows the tile array to dynamically reconfigure itself to support efficient partial calculation operation, broadcast, and reduction operations, as well as resource acquisition operation. For example, as shown in FIG. 4, tiles 401-415 are connected in serial sequentially.

Figure 5:
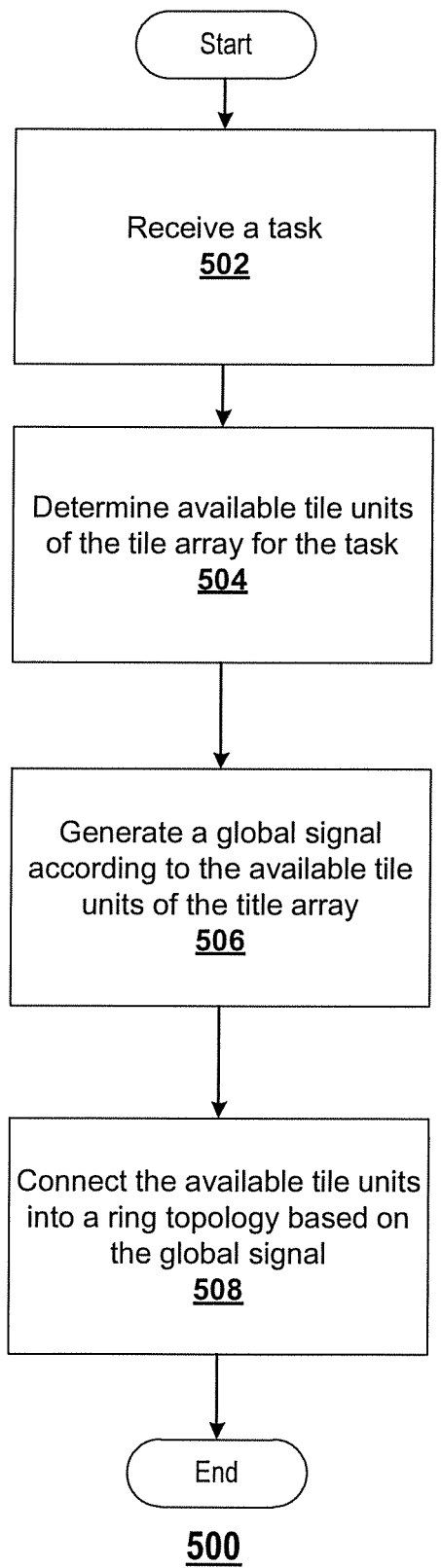
FIG. 5 is a flowchart of an exemplary resource acquisition operation, according to embodiments of the disclosure.

To assist with this reconfiguration, a resource acquisition operation can be performed. FIG. 5 is a flowchart of an exemplary resource acquisition operation 500, according to embodiments of the disclosure. For example, resource acquisition operation 500 can be performed by an on-chip communication system (e.g., on-chip communication system 102).

In step 502, the on-chip communication system can receive a task from an on-chip architecture. In some embodiments, a cluster manager (e.g., cluster manager 202 of FIG. 2) of the on-chip communication system can receive the task. The task can be a neural processing task. When a new task with a given resource requirement in terms of tile numbers coming from the driver, a free cluster can be identified and receive the task. If no free cluster manager can be identified, the task can be rejected.

In step 504, on-chip communication system (e.g., the cluster manager) can determine available tile units of the tile array for the task. As on-chip communication system 102 can handle multiple tasks simultaneously, it is possible that a portion of the tile array has been occupied by an earlier task. If a number of available tile units is larger than a number requested by the task, the task can be admitted; otherwise the task is rejected.

If the task is admitted, in step 506, the on-chip communication system (e.g., the cluster manager) can generate a global signal according to the available tile units of the tile array. For example, the global signal can be generated in view of a resource bitmask indicating the available tile units of the tile array. The resource bitmask can be managed collectively by cluster managers to record available tile units across the mesh array. When a task is finished, the corresponding cluster manager can release the resource by unsetting the corresponding bits in the resource bitmask. The operation on the resource bitmask from different cluster managers can serialized to avoid race condition.

In step 508, the on-chip communication system (e.g., the cluster manager) can connect the available tile units into a ring topology based on the global signal. In some embodiments, on-chip communication system 102 can transmit the global signal to the available tile units of the tile array. For example, the global signal can include a cluster identification (ID) of cluster manager 202, and cluster manager 202 can send, via the global bus, the global signal along with the resource bitmask to the available tile units. After the available tile units have received the global signal, control unit 324 in each node of the available tile units can check the cluster ID and the resource bitmask against its own node ID to see if the received global signal belongs to control unit 324. If the received global signal belongs to control unit 324, control unit 324 can further determine its location in the mesh array. Based on the location information, control unit 324 can further generate the SEL signal based on the global signal, to configure two neighboring connectors belonging to each node. According to the SEL signal, tiles can be connected into ring topology 400 as shown in FIG. 4.

Furthermore, with ring topology 400 established using the aforementioned steps, cluster manager 202 can further determine, among the nodes of the available tile units, a home node based on the task. For example, cluster manager 202 can determine a node sitting in the middle of the ring as the home node. It is also possible that the home node is not a central node. For example, as shown in FIG. 4, a bottom node of tile 407 is the home node (HN).

After the establishment of ring topology 400, various operations can be performed using on-chip communication system 102. Such exemplary operations can include a partial calculation operation, a reduction operation, a broadcast operation, and the like. These operations will be further described below.

Figure 6:
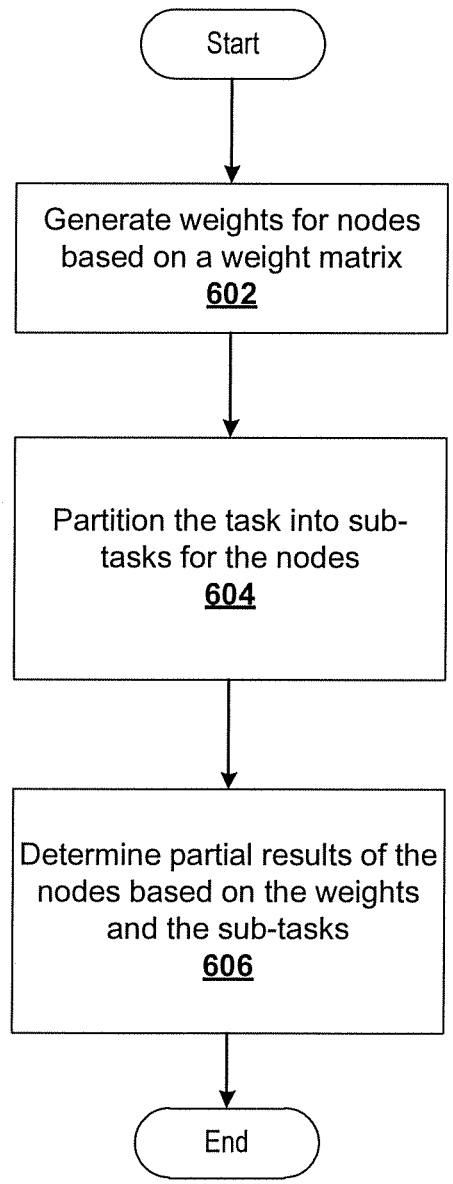
FIG. 6 illustrates a flowchart of an exemplary partial calculation operation, according to embodiments of the disclosure.

FIG. 6 illustrates a flowchart of an exemplary partial calculation operation 600, according to embodiments of the disclosure. After ring topology 400 has been established, it can be used for partial calculation operation 600 for the neural network layers. For example, partial calculation operation 600 can be performed by on-chip communication system 102.

In step 602, an on-chip communication system can generate weights for nodes based on a weight matrix. Generally, a neural network can be organized in layers. Each layer can perform calculation on its inputs and generate an output. The output of a layer can be passed onto a next layer for further processing. For example, an output of a previous layer can be an input for the next layer. To perform the calculation, each layer can be assigned with a weight, and the weight matrix of the neural network can include all weights assigned to the layers. The weight matrix can be generated according to the structure of the neural network and the nature of the task. For example, the weight matrix can be partitioned according to ring topology 400. By partitioning the weight matrix, each node can acquire a corresponding weight needed for calculation.

In step 604, the on-chip communication system can partition the task into sub-tasks for the nodes. Each node (e.g., node 306 of FIG. 3A) can activate the buffer bus and load data of the sub-task into the FIFO buffer to the ALU unit for calculation. To partition the task, the task can be moved along ring topology 400 one node at a time in a direction. The direction can be clockwise or counterclockwise. In some embodiments, during the movement of the task, each node can receive the data previously allocated to a previous node. For example, when the calculation is a multiplication of two matrices (e.g., the weight matrix and the matrix associated with the task), each node can generate an element in the matrix product. With reference to the below Equation 1, for example, X11-X23 can indicate the weights and Y11-Y32 can indicate the data, and node 306 can generate the partial result of Z21. It is noted that node 306 acquires same data (i.e., Y11, Y21, and Y31) as the data for Z11, which can be previously allocated to the previous node.

$$\begin{bmatrix} Z11 & Z12 \\ Z21 & Z22 \end{bmatrix} = \begin{bmatrix} X11 & X12 & X13 \\ X21 & X22 & X23 \end{bmatrix} \times \begin{bmatrix} Y11 & Y12 \\ Y21 & Y22 \\ Y31 & Y32 \end{bmatrix}$$ (Equation 1)

$$= \begin{bmatrix} X11 \times Y11 + X12 \times Y21 + & X11 \times Y12 + X12 \times Y22 + \\ X13 \times Y31 & X13 \times Y32 \\ X21 \times Y11 + X22 \times Y21 + & X21 \times Y22 + X22 \times Y22 + \\ X23 \times Y31 & X23 \times Y32 \end{bmatrix}$$

Based on the weights and the data of the sub-task, each node can calculate partial results of the assigned layer outputs. Thus, in step 606, each node of the on-chip communication system can determine partial results of the nodes based on the weights and the sub-tasks. This determination can be performed via a calculation. By determining the partial results, the final outputs can be produced after each partition of the input data have been transversed over ring topology 400.

Figure 7:
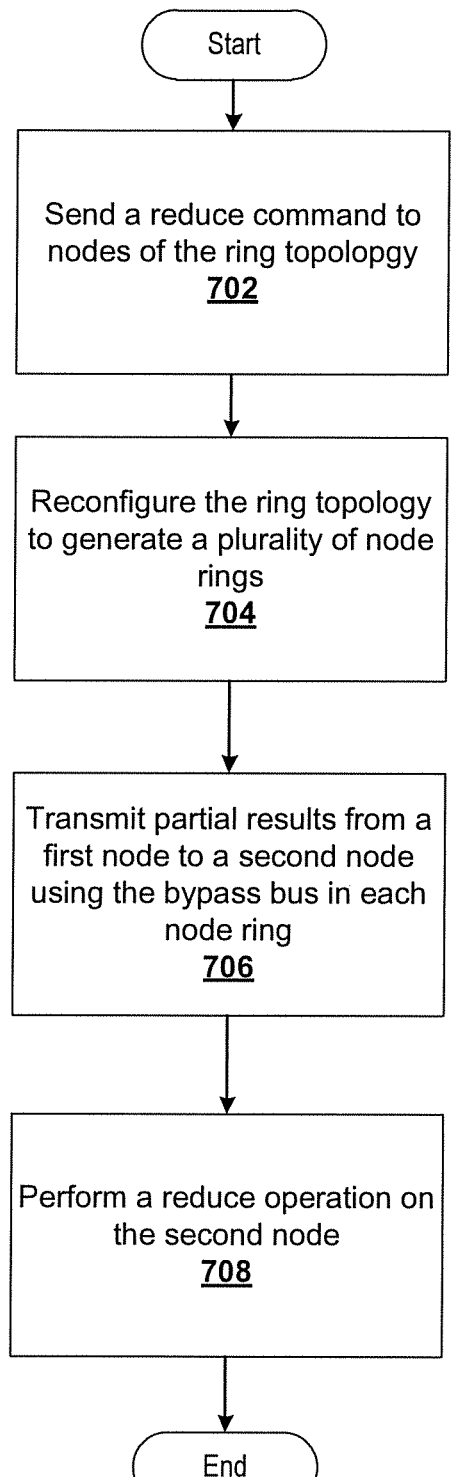
FIG. 7 illustrates an exemplary reduction operation using an on-chip communication system, according to embodiments of the disclosure.

FIG. 7 illustrates an exemplary reduction operation 700 using an on-chip communication system (e.g., on-chip communication system 102 of FIG. 2), according to embodiments of the disclosure.

In step 702, after a ring topology (e.g., ring topology 400 of FIG. 4) has been established and all nodes have finished calculating their own value, an on-chip communication system can send, via a cluster manager, a reduce command to a node (e.g., node 306 of FIG. 3A). In some embodiments, the reduce command can be sent with a cluster ID to control unit 324 of node 306 through a global bus. Control unit 324 of node 306 can verify the reduce command and the cluster ID to determine if the reduce command is associated with node 306.

Figure 8:
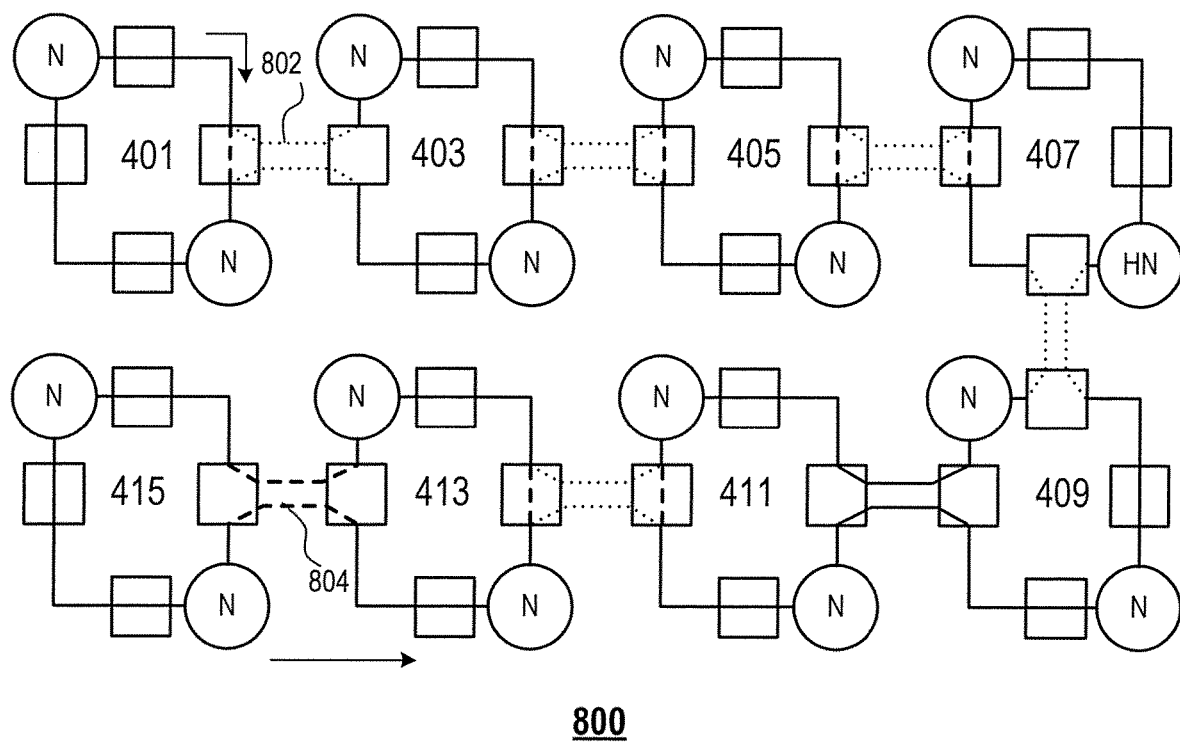
FIG. 8 illustrates a schematic diagram of an exemplary reconfigured ring topology, according to embodiments of the disclosure.

In step 704, the on-chip communication system can reconfigure the ring topology to generate a plurality of node rings. In some embodiments, on-chip communication system 102 can disconnect tiles in ring topology 400 from each other, and reconfigure the tiles to form a plurality of node rings. FIG. 8 illustrates a schematic diagram of an exemplary reconfigured ring topology 800, according to embodiments of the disclosure. As shown in FIG. 8, the earlier connections among tiles 401-415 are disconnected, and illustrated by dotted lines (e.g., 802). Two tile units within each tile are connected to form the two-node ring. The two tile units within one tile can include a top node and a bottom node. In some embodiments, connection can be established across more than two tiles, and the reconfigured node ring can include more than two tiles. For example, as shown in FIG. 8, four nodes of tile 413 and 415 can be connected to form a four-node ring. It is appreciated that six-node ring can also be formed similarly. Therefore, the node ring can be a two-node ring, a four-node ring, a six-node ring, or the like.

Referring back to FIG. 7, in step 706, the on-chip communication system can transmit the partial results from a first node to a second node using the bypass bus in each node ring. As each node can perform a calculation and contain a partial result, a partial reduction can be performed on the stored data (e.g., the weights) of the first and second nodes to generate partial results. These partial results can be further collectively processed. In some embodiments, the partial results can be transmitted to the second node and collectively processed. As shown in FIG. 8, partial results can be transmitted from a top node of tile 401 to a bottom node of tile 401. It is appreciated that the data can be transmitted from the bottom node to the top node as well.

In some embodiments, data can be transmitted from a bottom node of a first tile to a bottom node of a second tile, wherein the bottom node of the second tile is closer to the home node than other nodes in the node ring. For example, as shown in FIG. 8, the bottom node of tile 407 can be set as the home node, and therefore, data can be transmitted from a bottom node of tile 415 to a bottom node of tile 413 through a connection 804. It is appreciated that, when a node ring includes the home node, the data can be transmitted to the home node. Thus, by transmitting the data to a node closer to the home node, the data can be communicated to the home node eventually.

In step 708, the on-chip communication system can perform a reduce operation on the second node. For example, by transmitting the partial results from top node to the bottom node, the bottom node can perform the partial reduction on the bottom node. The partial reduction can be performed in parallel on all tiles of the tile array. By repeating the reconfiguration of the ring topology, the transmission of data between nodes, and the operation of transmitted data, all partial results of the partial reductions can be collected by the home node, and the home node can perform the final reduction. The reconfiguration of the ring topology can be associated with the task. In some embodiments, multiple two-node rings can be formed first to process partial reduction operations in parallel. For example, each two-node ring can include the two nodes of tiles 401-415, respectively. And the results can be stored in the bottom nodes of the multiple two-node rings as discussed above. Then, multiple four-node rings can be formed to further perform reduction operations on the results stored in the bottom nodes in the previous two-node rings, and the results can be stored in some bottom nodes closer to the home node. For example, with reference to FIG. 8, the four-node rings can include a ring including a pair of tiles 401 and 403, a pair of tiles 405 and 407, a pair of tiles 409 and 411, and a pair of tiles 413 and 415. Then, multiple six-node rings can be formed to transmit and process the results generated by the four-node rings. For example, the six-node ring can include a ring of tiles 403, 405, and 407, and therefore, the results stored in previous four-node ring (e.g., the bottom node of tile 403) can be transmitted to the home node (e.g., the bottom node of tile 407) for further processing. It is appreciated that the reconfiguration can be adapted to tasks and the scale of the tile array.

Figure 9:
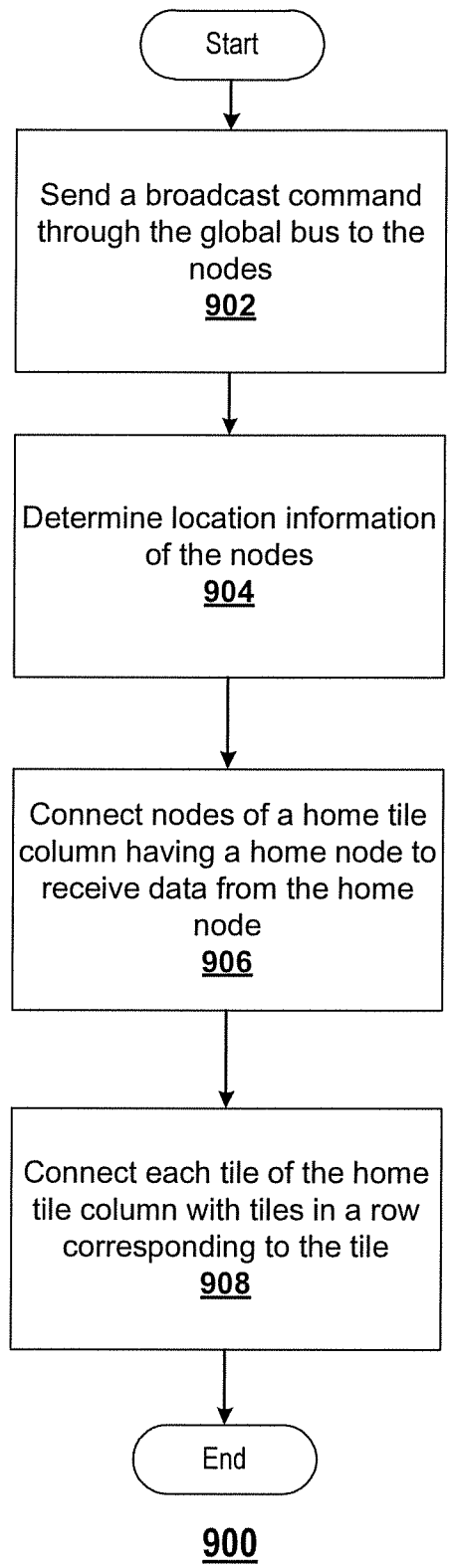
FIG. 9 illustrates an exemplary broadcast operation using an on-chip communication system, according to embodiments of the disclosure.

FIG. 9 illustrates an exemplary broadcast operation 900 using an on-chip communication system (e.g., 102 on-chip communication system of FIG. 2), according to embodiments of the disclosure. For example, as discussed above with reference to FIG. 7, the home node can perform a final reduction operation. For example, the ALU unit of the home node can perform the final reduction. After the final reduction has been performed, the reduction results can be loaded into the transmission unit (e.g., transmission unit 320 of FIG. 3B) of the home node. Then, the on-chip communication system can perform broadcast operation 900 to broadcast the final result. It is appreciated that, before broadcast operation 900, connections of all tiles involved in broadcast operation 900 can be reset. For example, connections between tiles can be broken up, and nodes of each tile can be connected into a two-node ring.

In step 902, an on-chip communication system can send a broadcast command to the nodes. In some embodiments, after the home node has loaded the final result into transmission unit 320, the broadcast command can be sent to the nodes along with a cluster ID through the global bus. Control unit 324 of each node can verify the broadcast command according to the cluster ID. Therefore, each node can determine if the broadcast command is associated with it.

In step 904, the on-chip communication system can determine location information of the nodes (e.g., node 306). The location information of the nodes can be used to generate a command for broadcast operation 900. For example, broadcast operation 900 can include a series of the coordinated control signals that control connectors and bus selections of a node for broadcast operation 900. These control signals can include operation sequences for each connector of the node to connect or disconnect with connectors of neighboring nodes according to locations of the node and its neighboring nodes. As only some nodes are available for broadcast operation 900, it is possible that connectors of some neighboring nodes are not available. Thus, the location information of the nodes (e.g., 306) can include mesh array location information in the mesh array and relative location in ring topology 400.

Figure 10A:
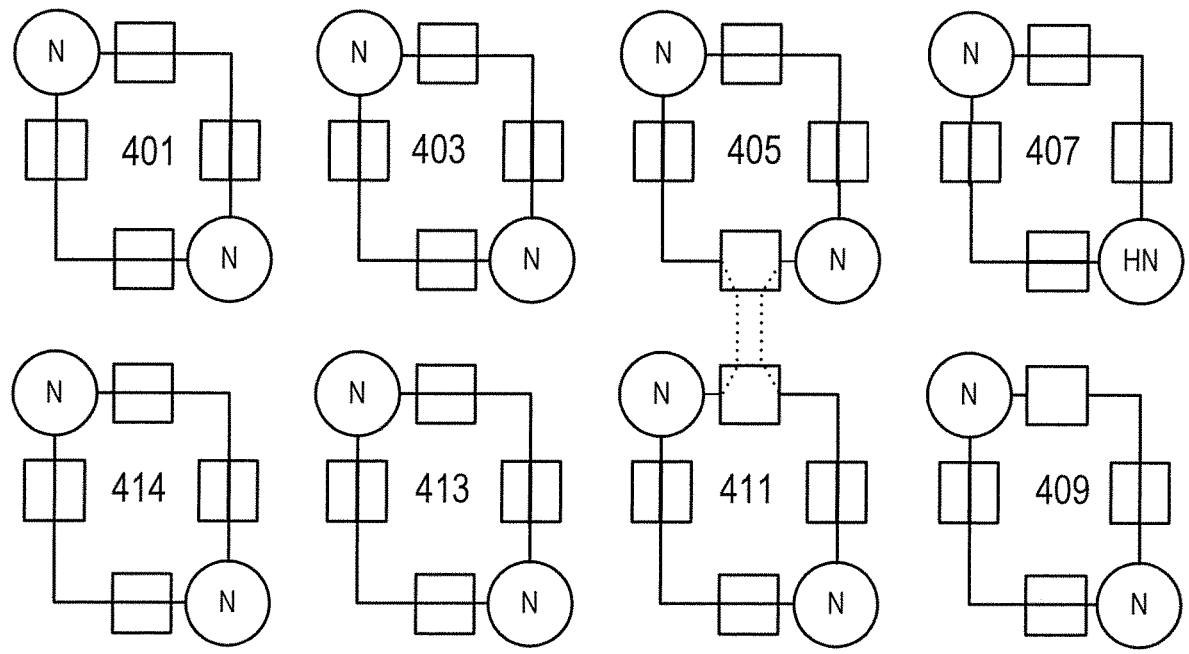
FIG. 10A illustrates a schematic diagram of an exemplary connection of a home tile column, according to embodiments of the disclosure.

In step 906, the on-chip communication system can connect tiles of a home tile column including the home node to receive data from the home node. The tile array can include tile columns and tile rows, and a tile column containing the home node can be referred to as the home tile column. FIG. 10A illustrates a schematic diagram of an exemplary connection 1000 of a home tile column, according to embodiments of the disclosure. As shown in FIG. 10A, the bottom node of tile 407 is a home node (HN), and therefore the home tile column can include tiles 407 and 409. On-chip communication system 102 can connect tiles 407 and 409 with the home node, so that nodes (e.g., nodes of tile 409 and the top node of tile 407) of tiles 407 and 409 can receive the data from the home node. It is appreciated that, only the non-home nodes of the tile can be connected to the home node and receive data from the home node.

In some embodiments, the nodes (e.g., nodes of tile 409 and the top node of tile 407) other than the home node can enable the bypass bus of each node, so that the bypass bus of each node can be connected to the bypass bus of the home node. The data stored in the transmission unit of the home node can be received by other nodes by applying the receiving enable signal and negating the transmission enable signal. Meanwhile, the transmission enable signal of the home node can be enabled. Thus, the data stored in the home node can be loaded into the bypass bus of the home node, and nodes other than the home node can receive the transmitted data from the loaded bypass bus.

Figure 10B:
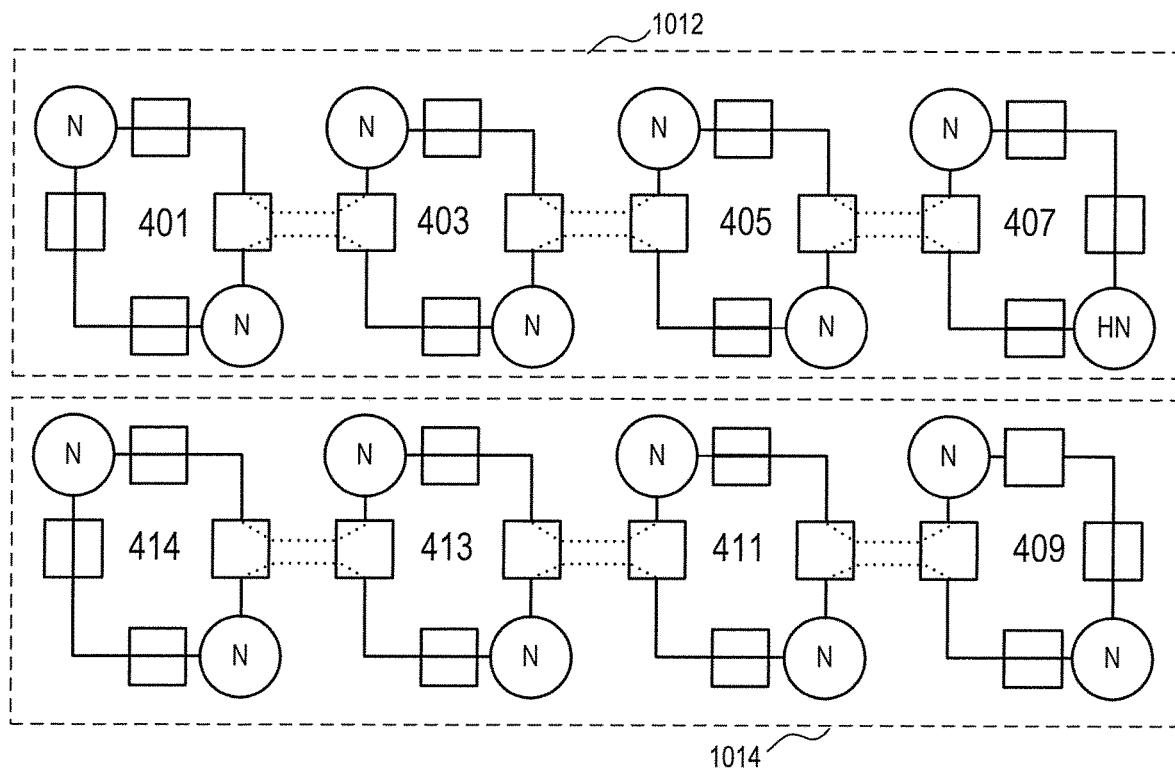
FIG. 10B illustrates a schematic diagram of another exemplary connection of tile rows, according to embodiments of the disclosure.

In step 908, the on-chip communication system can connect each tile of the home tile column with tiles in a row corresponding to the tile. In some embodiments, before step 908, the on-chip communication system can disconnect the nodes of the home tile column. FIG. 10B illustrates a schematic diagram of an exemplary connection 1010 of tile rows, according to embodiments of the disclosure. As discussed above, the home tile column can include tiles 407 and 409, and tiles 407 and 409 can correspond to row 1012 and 1014, respectively. Row 1012 can include tiles 401-407, and row 1014 can include tiles 409-415. Therefore, on-chip communication system 102 can connect tiles 401-407 with each other, and connect tiles 409-415 with each other. Similarly, on-chip communication system 102 can enable the bypass buses of these tiles, so that data stored in tiles 407 and 409 of the tile column can be broadcasted to the rest of tiles.

It is appreciated that, for broadcast operation 900, a tile row could be used instead of a tile column, and vice versa. For example, in step 906, tiles of a home tile row can be connected, rather than the tiles of the home tile column. And accordingly, in step 908, tiles of tile columns can then be connected.

The disclosed embodiments provide an elastic router-less interconnection fabric that addresses the shortcomings existing in conventional solutions. The embodiments described herein provide a flexible routerless on-chip communication system as well as its working mechanism. By using coordinated control across the nodes, they can completely avoid the routers in the communication fabric, and can efficiently support all the communication patterns required by artificial neural network processing.

First, the proposed on-chip communication system can be routerless, and can eliminate the inefficiencies caused by the router. The First-In-First-Out (FIFO) buffer in the node of the on-chip communication system is a place where the data can be directly used by the arithmetic logic unit (ALU). Using coordinated control, the on-chip communication system does not require credit-based flow control, nor routing table lookup, nor virtual lane management, and is deadlock free. In addition, because there is no router per se, the data are not required to be broken into pieces and encapsulated in packets with headers and tails.

Second, the bypass bus in the on-chip communication system not only provides broadcast capability, but also allows nodes to be by-passed for point-to-point data transfer. Therefore, it is more efficient and scalable compared with conventional mesh network where data have to be transferred one hop at a time.

Third, with the dynamic connectors in each tile and the centralized cluster managers, the on-chip resources can be partitioned effectively and flexibly. Therefore, multi-tasking can be directly supported. Moreover, within each partition, the actual tile usage can be naturally expanded or shrunk according to the computation demand variation as the processor goes through different layers of neural network. This provides the opportunity to further improve the efficiency using clock gating/power gating on those inactive tiles in the active partition.

Other aspects and embodiments of the present disclosure will be apparent to those skilled in the art from consideration of the specification and practice of the embodiments disclosed herein.

It is intended that the specification and examples therein be considered as exemplary only, with a true scope and spirit of the present disclosure being indicated by the following claims.

What is claimed is:

1. An on-chip communication system for artificial neural network processors, comprising:
   a cluster manager configured to:
      receive a task,
      determine available tile units of a tile array for the task,
      generate the global signal according to available tile units of the tile array, and connect the available tile units into a ring topology based on the global signal;
a bus;
a plurality of tile units in the tile array, the plurality of tile units are communicatively coupled with the cluster manager via the bus, wherein each tile unit includes a first set of connectors and at least one node that is connected between at least two connectors of the first set of connectors, wherein the at least one node is configured to acquire the global signal; and
a control unit configured to:
generate at least one of a transmission enable signal, a receiving enable signal, and a mode signal based on the global signal acquired via the bus, and
generate a selection signal that is based on the global signal, wherein the selection signal configures one or more connectors of the first set of connectors.

2. The on-chip communication system of claim 1, wherein the node is communicatively coupled to a first connector of the first set of connectors via a first terminal and to a second connector of the first set of connectors via a second terminal, wherein the node further comprises:
a bypass bus connected between the first terminal and the second terminal and configured to communicate data signals between the first and second terminals;
a buffer bus connected between the first and second terminals and configured to buffer the data signals; and
one or more multiplexers configured to enable one of the bypass bus and the buffer bus according to the mode signal that is based on the configuration of the node.

3. The on-chip communication system of claim 2, wherein the node further comprises:
an arithmetic logic unit (ALU) configured to perform one or more operations based on the data signals, wherein the ALU is communicatively coupled with the bypass bus and the buffer bus.

4. The on-chip communication system of claim 2, wherein the node further comprises:
a transmission unit coupled with the bypass bus and configured to transmit data to the bypass bus according to the transmission enable signal; and
a receiving unit coupled with the bypass bus and configured to receive data from the bypass bus according to the receiving enable signal.

5. The on-chip communication system of claim 2, wherein the receiving unit is further coupled with the buffer bus to receive data from the buffer bus according to the receiving enable signal.

6. The on-chip communication system of claim 1, wherein the one or more connectors of the first set of connectors further comprises:
a first gate communicatively coupled to the node and a connector of a second set of connectors;
a second gate communicatively coupled to the node and a connector of a third set of connectors; and
a third gate communicatively coupled to the connector of the second set of connectors and the connector of the third set of connectors.

7. The on-chip communication system of claim 6, wherein the first gate is configured to be enabled when the selection signal is asserted,
the second gate is configured to be enabled when the selection signal is asserted, and
the third gate is configured to be enabled when the selection signal is disasserted.

8. The on-chip communication system of claim 1, wherein the available tile units are configured to:
generate location information of the available tile units;
generate the selection signal based on the location information; and
establish, by connecting the connectors of the available tile units, the ring topology based on the selection signal.

9. The on-chip communication system of claim 1, wherein the cluster manager is further configured to:
generate weights for nodes of the ring topology based on a weight matrix;
partition the task into sub-tasks for the nodes; and
determine partial results of the nodes based on the weights and the sub-tasks.

10. The on-chip communication system of claim 1, wherein the cluster manager is further configured to:
determine, among the nodes of the available tile units, a home node based on the task.

11. The on-chip communication system of claim 10, wherein the cluster manager is further configured to:
send a reduce command to nodes of the ring topology;
reconfigure the ring topology to generate a plurality of node rings, wherein each node ring includes a first node and a second node;
transmit the partial results from the first node to the second node; and
perform a reduce operation on the second node.

12. The on-chip communication system of claim 11, wherein the second node is closer to the home node than other nodes in the node ring.

13. The on-chip communication system of claim 10, wherein two tile units connected with each other form a tile of the tile array, the cluster manager is further configured to:
send a broadcast command to the nodes of the available tile units;
determine location information of the nodes of the available tile units;
connect non-home nodes of a home tile column including the home node to receive data from the home node; and
connect each tile of the home tile column with tiles in a row corresponding to the tile.

14. A processing device communicatively coupled to one of a first set of connectors via a first terminal and to another one of the first set of connectors via a second terminal, comprising:
a bypass bus connected between the first and second terminals and configured to communicate data signals between the first and second terminals;
a buffer bus connected between the first and second terminals and configured to buffer the data signals; and
one or more multiplexers configured to enable one of the bypass bus and the buffer bus according to a mode signal, wherein each connector of the first set of connectors comprises:
a first gate communicatively coupled to the processing device and a connector of a second set of connectors, wherein the first gate is configured to be enabled when a selection signal is asserted;
a second gate communicatively coupled to the processing device and a connector of a third set of connectors, wherein the second gate is configured to be enabled when the selection signal is asserted; and
a third gate communicatively coupled to the connector of the second set of connectors and the connect of the third set of connectors, wherein the third gate is configured to be enabled when the selection signal is disasserted, wherein the selection signal is generated by a control unit based on a global signal.

15. The processing device of claim 14, further comprising: an arithmetic logic unit (ALU) configured to perform one or more operations based on the data signals, wherein the ALU is communicatively coupled with the bypass bus and the buffer bus.

16. The processing device of claim 15, further comprising:
- a transmission unit connected with the bypass bus and configured to transmit data to the bypass bus according to a transmission enable signal; and
- a receiving unit connected with the bypass bus and configured to receive data from the bypass bus according to a receiving enable signal.

17. The processing device of claim 16, wherein the receiving unit is further connected with the buffer bus to receive data from the buffer bus according to the receiving enable signal.

18. The processing device of claim 16, further comprising:
- a control unit, configured to generate the transmission enable signal, the receiving enable signal, and the mode signal based on a global signal.

\* \* \* \* \*